US012786610B2

(12) United States Patent
Katsuhara

(10) Patent No.: US 12,786,610 B2
(45) Date of Patent: Nov. 3, 2026

(54) INFORMATION PROCESSING APPARATUS AND INFORMATION PROCESSING METHOD

(71) Applicant: SONY GROUP CORPORATION, Tokyo (JP)

(72) Inventor: Mao Katsuhara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 103 days.

(21) Appl. No.: 18/720,508

(22) PCT Filed: Dec. 14, 2022

(86) PCT No.: PCT/JP2022/046030

§ 371 (c)(1),
(2) Date: Jun. 14, 2024

(87) PCT Pub. No.: WO2023/127497

PCT Pub. Date: Jul. 6, 2023

(65) Prior Publication Data

US 2025/0056147 A1 Feb. 13, 2025

(30) Foreign Application Priority Data

Dec. 27, 2021 (JP) ................................ 2021-212651

(51) Int. Cl.
*H04R 1/10* (2026.01)

(52) U.S. Cl.
CPC ......... *H04R 1/1041* (2013.01); *H04R 1/1016* (2013.01)

(58) Field of Classification Search
CPC ...... H04R 4/04; H04R 4/033; H04R 2201/10; H04R 2420/03; A61B 5/02116; A61B 5/02125; A61B 5/02108
See application file for complete search history.

(56) References Cited

U.S. PATENT DOCUMENTS

2011/0051947 A1* 3/2011 Macours ............. A61B 5/6803
381/74

FOREIGN PATENT DOCUMENTS

| | | | | |
|---|---|---|---|---|
| EP | 2293589 A1 | | 3/2011 | |
| JP | 2018-011641 A | | 1/2018 | |
| JP | 2018-515045 A | | 6/2018 | |
| JP | 2019-145965 A | | 8/2019 | |
| JP | 3230859 U | * | 2/2021 | |
| KR | 10-1560287 B1 | | 10/2015 | |
| WO | WO-2010079257 A1 | * | 7/2010 | ......... A61B 5/02438 |

OTHER PUBLICATIONS

International Search Report and Written Opinion of PCT Application No. PCT/JP2022/046030, issued on Mar. 7, 2023, 09 pages of ISRWO.

* cited by examiner

*Primary Examiner* — Sunita Joshi
(74) *Attorney, Agent, or Firm* — CHIP LAW GROUP

(57) ABSTRACT

Provided is an information processing apparatus that enables determining whether each unit of a device is worn on a left side or right side of a body of a user. The information processing apparatus determines, on the basis of a time difference in pulse waves measured in each of a plurality of units that constitutes a device worn by the user, whether each of the units is worn on the left side or right side of the body of the user.

17 Claims, 14 Drawing Sheets

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2022/046030 filed on Dec. 14, 2022, which claims priority benefit of Japanese Patent Application No. JP 2021-212651 filed in the Japan Patent Office on Dec. 27, 2021. Each of the above-referenced applications is hereby incorporated herein by reference in its entirety.

TECHNICAL FIELD

The present technology relates to an information processing apparatus, an information processing method, and a program, and more particularly, to an information processing apparatus, an information processing method, and a program that enable determining whether each unit of a device is worn on a left side or right side of a body of a user.

BACKGROUND ART

In recent years, devices such as headphones and earphones equipped with a function of detecting a state of being worn on a body of a user have been proposed. By detecting the wearing state, it is possible to provide a service corresponding to the wearing state, from a system side to the user.

Patent Document 1 discloses a technique of detecting a wearing state of earphones on the basis of a result of measurement by a sensor such as an optical proximity sensor, a pressure sensor, a heat sensor, or a moisture sensor, and controlling an audio output according to the wearing state.

CITATION LIST

Patent Document

Patent Document 1: Japanese Unexamined Patent Application Publication No. 2018-515045

SUMMARY OF THE INVENTION

Problems to be Solved by the Invention

Completely independent wireless earphones, which are earphones of which left and right units are completely independent from each other, have become widespread. With a trend toward reduction in size, minimization of design, and the like, the left and right units of the earphones may be worn the other way around by mistake.

In a case where a stereo sound source is played in a state where the left ear unit and the right ear unit are worn the other way around, such as in a case where the left ear unit is worn on a right ear and the right ear unit is worn on a left ear, sound in an acoustic space different from sound in an acoustic space intended by a creator is presented to a user.

The present technology has been made in view of such a situation, and is to make it possible to determine whether each unit of a device is worn on a left side or right side of a body of a user.

Solutions to Problems

An information processing apparatus according to one aspect of the present technology includes a determination unit that determines, on the basis of a time difference in pulse waves measured in each of a plurality of units that constitutes a device worn by a user, whether each of the units is worn on a left side or right side of a body of the user.

In one aspect of the present technology, it is determined, on the basis of a time difference in pulse waves measured in each of a plurality of units that constitutes a device worn by a user, whether each of the units is worn on a left side or right side of a body of the user.

MODE FOR CARRYING OUT THE INVENTION

Hereinafter, a mode for carrying out the present technology will be described. The description will be given in the following order.

1. Overview of present technology
2. Configuration of information processing system
3. Operation of information processing system
4. Modifications
5. Others

1. Overview of Present Technology

Figure 1:
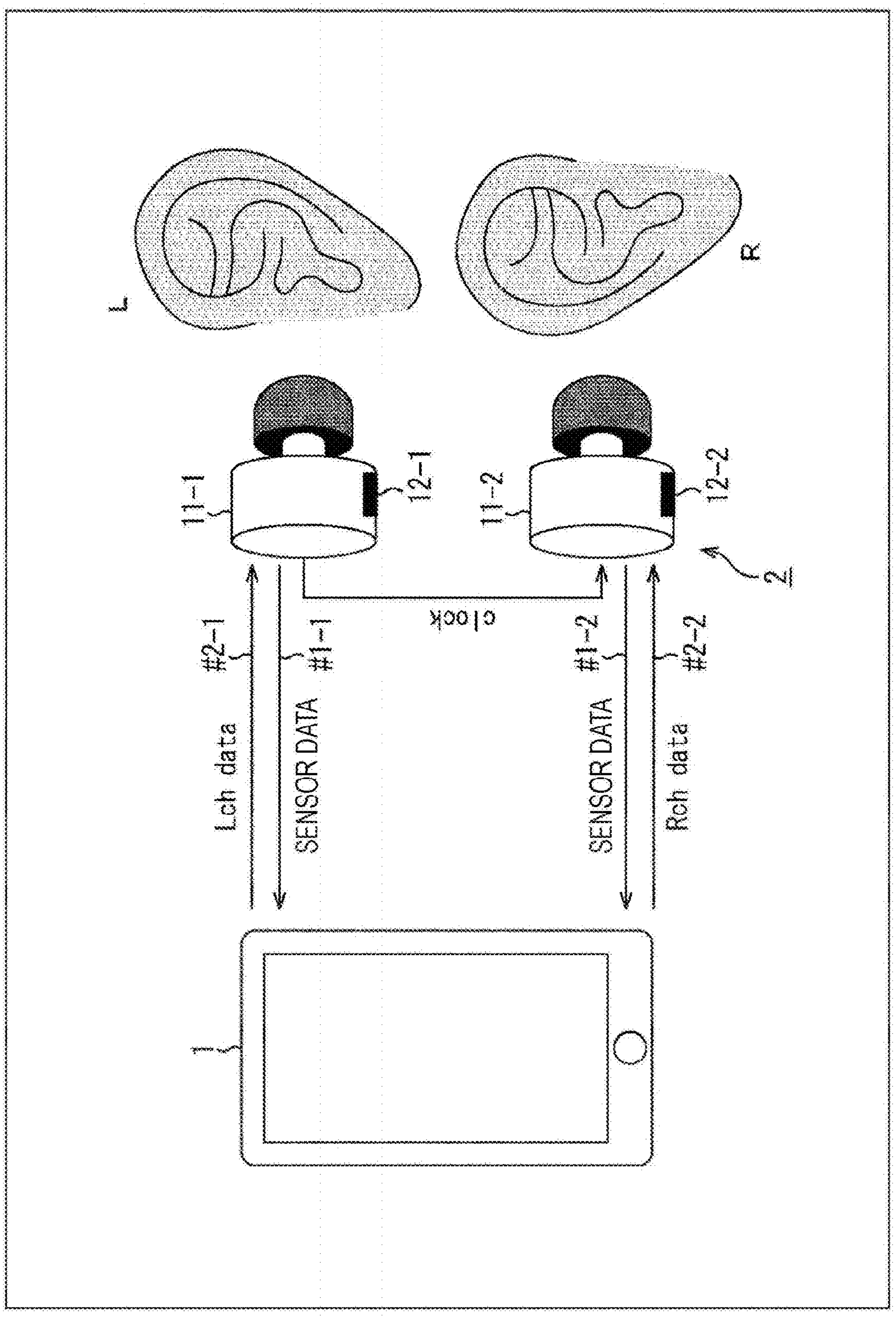
FIG. 1 is a diagram illustrating an example of an information processing system according to an embodiment of the present technology.

FIG. 1 is a diagram illustrating an example of an information processing system according to an embodiment of the present technology.

The information processing system according to an embodiment of the present technology includes a smartphone 1 and earphones 2. For example, the information processing system in FIG. 1 is used for a user to listen to music played on the smartphone 1 by using the earphones 2.

The earphones 2 are a so-called completely independent wireless earphones. A unit 11-1 and a unit 11-2 that constitute the earphones 2 are connected to the smartphone 1 via wireless communication such as Bluetooth (registered trademark) or a wireless LAN. The unit 11-1 and the unit 11-2 are also connected via wireless communication such as near field magnetic induction (NFMI), Bluetooth, or wireless LAN.

Instead of both the unit 11-1 and the unit 11-2 being connected to the smartphone 1, either the unit 11-1 or the unit 11-2 may be connected to the smartphone 1. In this case, communication between the smartphone 1 and another unit is performed via one unit directly connected to the smartphone 1. The earphones 2 may be connected to the smartphone 1 via a wired cable.

A housing of each of the unit 11-1 and the unit 11-2 has a bilaterally symmetrical shape or a shape approximate to a bilaterally symmetrical shape. In the example in FIG. 1, the unit 11-1 is worn on a left ear, and the unit 11-2 is worn on a right ear. Hereinafter, in a case where it is not necessary to distinguish between the unit 11-1 and the unit 11-2, they are collectively referred to as a unit 11 as appropriate. Similarly, configurations provided in the unit 11-1 and the unit 11-2 will be described together as appropriate.

As illustrated in color in FIG. 1, the unit 11-1 is provided with a pulse-wave sensor 12-1, and the unit 11-2 is provided with a pulse-wave sensor 12-2. A pulse-wave sensor 12 is a biosensor including a photo plethysmography (PPG) sensor or the like. The pulse-wave sensor 12 is provided at a position in contact with a concha of an ear when the unit 11 is worn on the ear, such as a peripheral surface of a cylindrical housing. The pulse-wave sensor 12 may be provided at another position of the housing of the unit 11.

In a case where the left and right units 11 are worn, pulse waves of portions near the left and right ears are measured by the respective pulse-wave sensors 12. An internal time (clock) of the unit 11-1 and an internal time of the unit 11-2, which define a pulse-wave measurement timing, are synchronized by, for example, transmitting and receiving clock signals.

Sensor data of the pulse wave measured at the left ear by the pulse-wave sensor 12-1 is transmitted to the smartphone 1 as denoted by the arrow #1-1. Similarly, sensor data of the pulse wave measured at the right ear by the pulse-wave sensor 12-2 is transmitted to the smartphone 1 as denoted by the arrow #1-2.

The smartphone 1 receives sensor data transmitted from each of the unit 11-1 and the unit 11-2. Furthermore, the smartphone 1 detects a time difference between peaks of left and right pulse waves, and, on the basis of the time difference between the peaks of the left and right pulse waves, performs left-right determination that is to determine whether each unit 11 is worn on the left ear or on the right ear.

Figure 2:
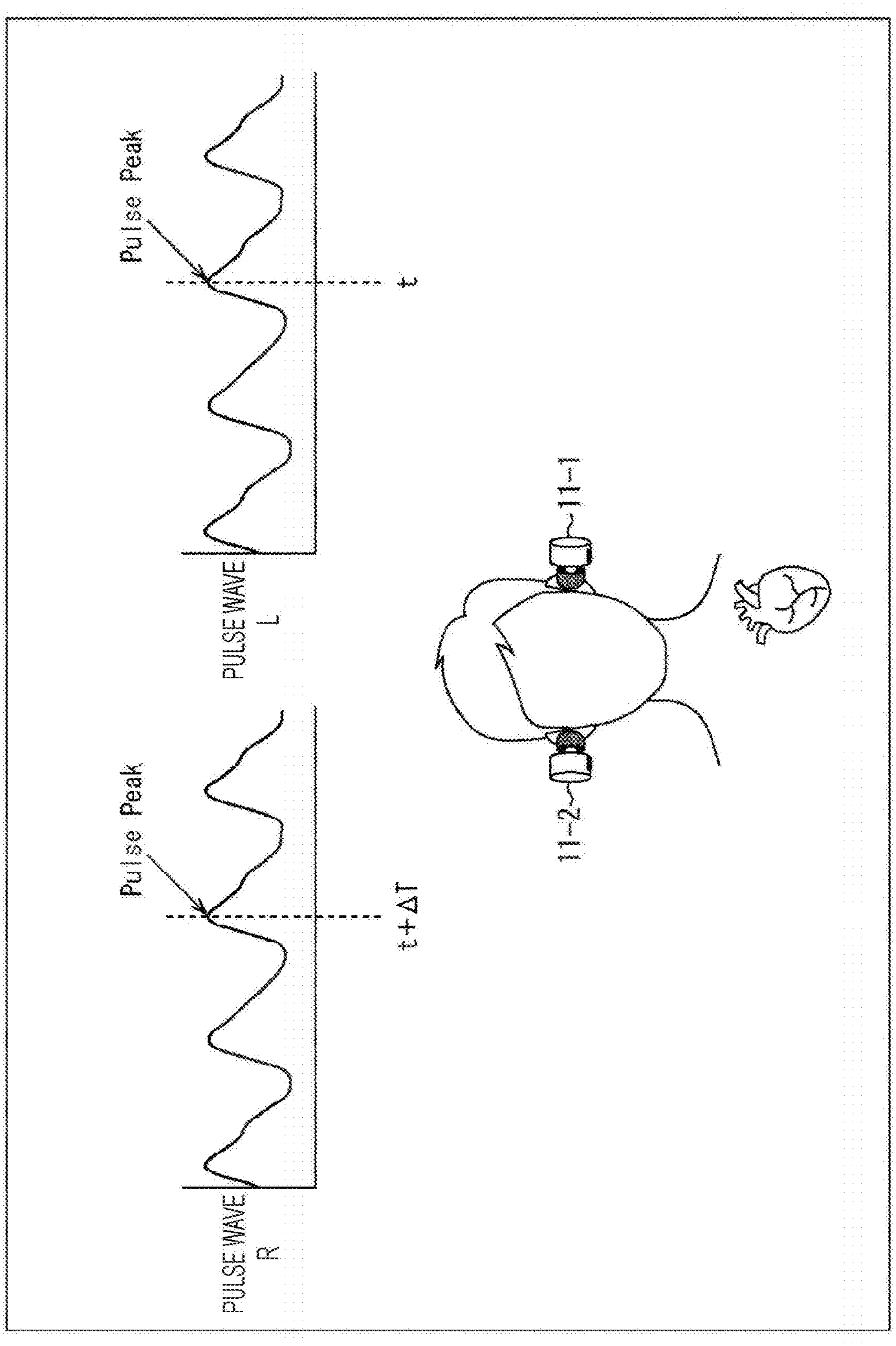
FIG. 2 is a diagram illustrating a difference in timings of peaks of pulse waves.

FIG. 2 is a diagram illustrating a difference in timings of peaks of pulse waves.

As illustrated in the lower part of FIG. 2, a human heart is positioned on a left side of a body. Therefore, in comparison between the timings of the peaks of the pulse waves measured at the left and right ears, the timing of the peak of the pulse wave on the left side is slightly earlier than the timing of the peak of the pulse wave on the right side. As illustrated in the upper part of FIG. 2, when a time of the peak of the pulse wave on the left side measured according to a heartbeat of the heart at a certain timing is time t, a time of the peak of the pulse wave on the right side is time t+Δt.

Figure 3:
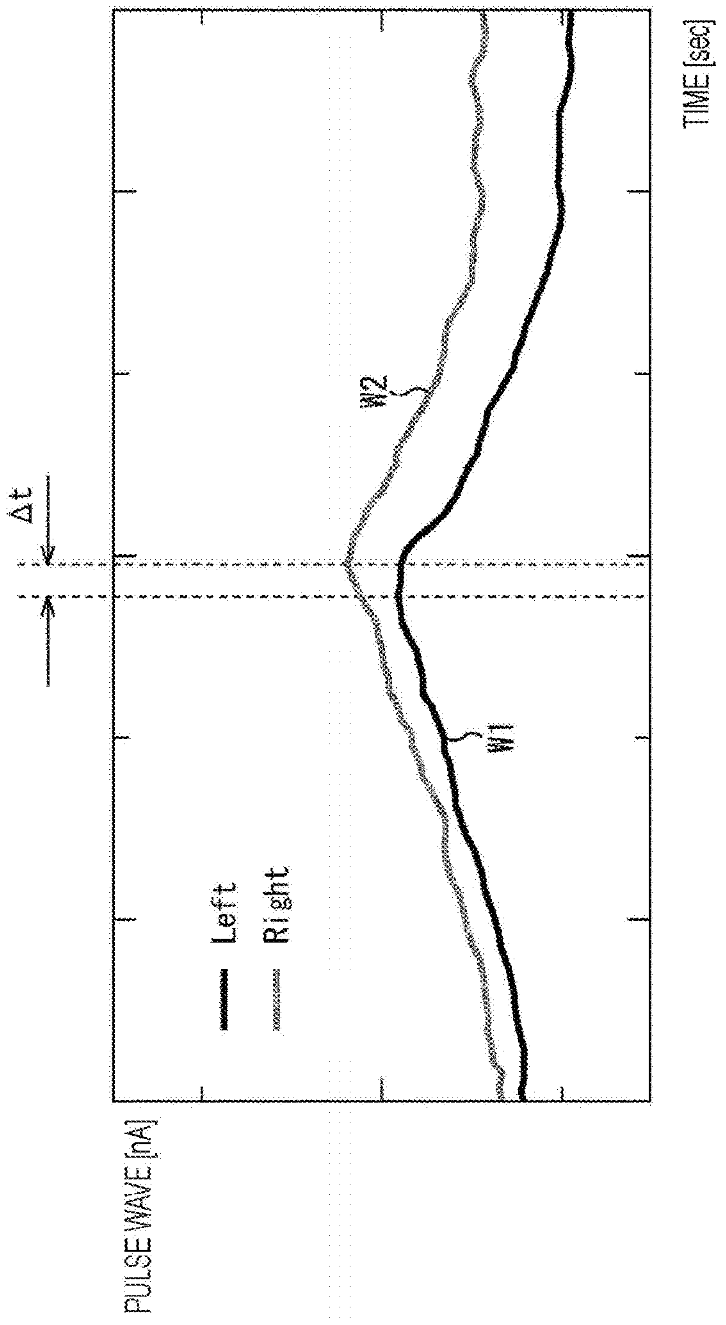
FIG. 3 is an enlarged view illustrating a difference between left and right pulse waves.

FIG. 3 is an enlarged view illustrating a difference between left and right pulse waves.

In FIG. 3, a waveform W1 represents the pulse wave on the left side, and a waveform W2 represents the pulse wave on the right side. As denoted by the opposing arrows, the time difference between the peaks of the pulse waves of the left and right ears is detected as time Δt.

As described above, the timings of the peaks of the pulse waves measured at the left and right ears are different generally by about 10 ms to 30 ms. Due to difference in path from the heart to a measurement position of a pulse wave, the timing of the peak of the pulse wave of the right ear is delayed with respect to the timing of the peak of the pulse wave of the left ear.

In the left-right determination, the smartphone 1 determines that the unit 11 for measuring a pulse wave having an early peak timing is worn on the left ear (left side of the body), and determines that the unit 11 for measuring a pulse wave having a late peak timing is worn on the right ear (right side of the body).

The difference between the timings of the peaks of the left and right pulse waves is as small as about 10 ms to 30 ms. Therefore, a frequency of 100 Hz or more, preferably 200 Hz or more, is used as a sampling frequency for the pulse-wave sensors when the left-right determination is performed.

As will be described later, in order to increase accuracy in detecting the peaks, signal processing such as differentiation and integration is performed on the sensor data of the pulse waves, and the peaks are detected on the basis of data subjected to the signal processing. Furthermore, at a time of the peak detection, the sensor data is interpolated with parabolic approximation, spline interpolation, or the like.

The smartphone 1 provides various services to the user on the basis of a result of such left-right determination. For example, as indicated by the arrows #2-1 and #2-2 in FIG. 1, the smartphone 1 transmits audio data for an L channel to the unit 11-1 determined to be worn on the left ear, and transmits audio data for an R channel to the unit 11-2 determined to be worn on the right ear.

Therefore, the user can wear the earphones 2 and listen to music from a stereo sound source in an acoustic space intended by a creator, without being conscious of a difference between the units 11 for the left ear and the right ear.

Furthermore, in a case where the unit 11-1 is set to be for the right ear and the unit 11-2 is set to be for the left ear, when the user wears the unit 11-1 and the unit 11-2 the other way around, the smartphone 1 presents to the user that the units 11 are worn the other way around. A result of the left-right determination is presented by using, for example, a screen displayed on a display of the smartphone 1 or audio output from the earphones 2.

Therefore, the user can notice that the units 11 are worn the other way around.

As described above, the smartphone 1 can perform left-right determination on the basis of a result of measuring the pulse waves on the unit 11-1 and the unit 11-2 worn on the left and right ears. Furthermore, the smartphone 1 can provide various services to the user on the basis of the result of the left-right determination.

In order to accurately detect the time difference between the peaks of the left and right pulse waves, it is necessary that the left and right pulse-wave sensors be worn at positions having an equal distance from the heart. In addition to the PPG sensor, a sensor that senses a change in speed, volume, sound, or the like of blood flowing through a blood vessel, such as a laser Doppler flow (LDF) sensor, a pressure sensor, a microphone, or a radar, can be used as the pulse-wave sensor 12.

A series of operations of the smartphone 1 that performs left-right determination as described above will be described later with reference to a flowchart.

2. Configuration of Information Processing System

Configuration of Smartphone 1

Figure 4:
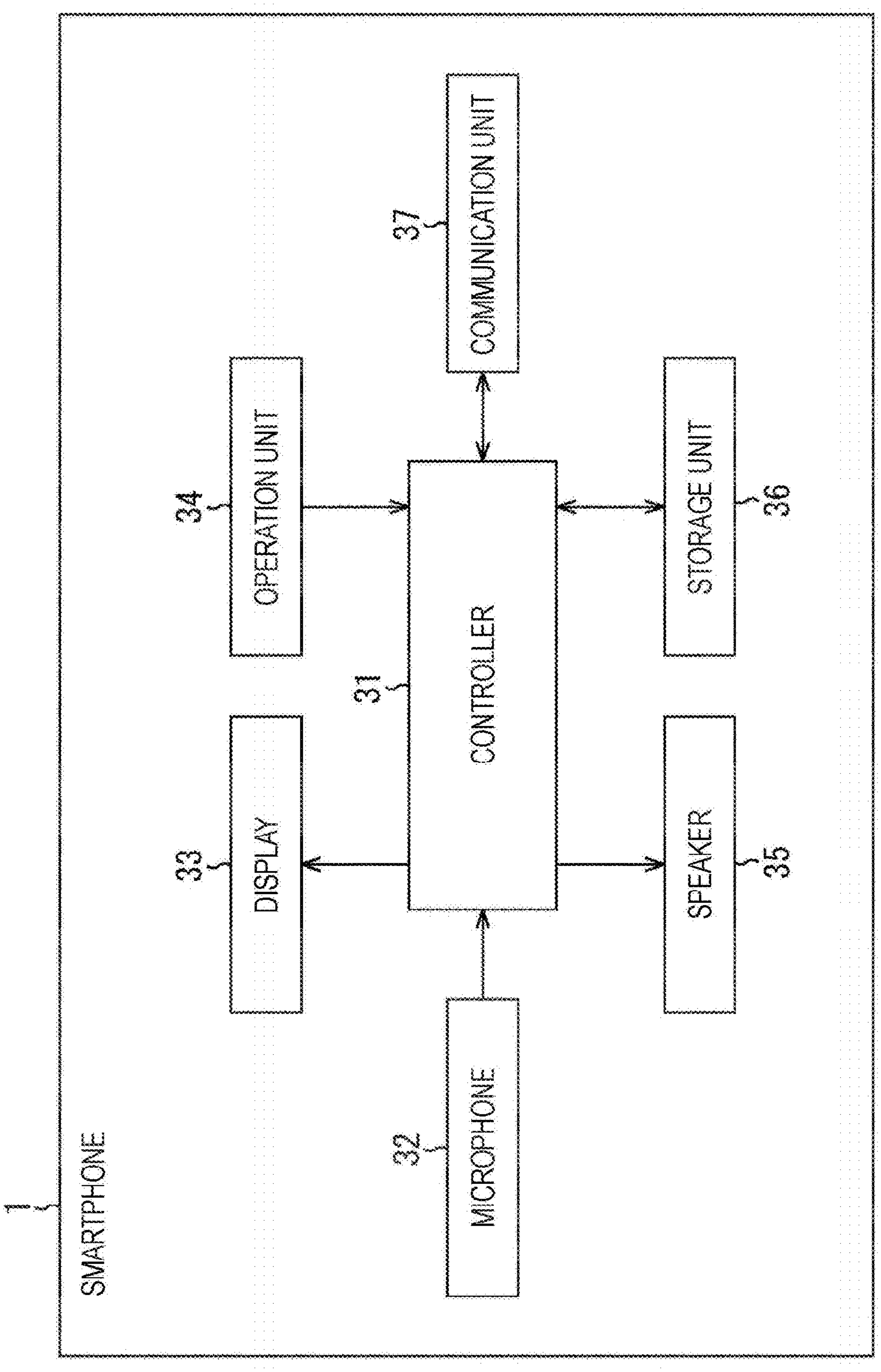
FIG. 4 is a block diagram illustrating a hardware configuration example of a smartphone.

FIG. 4 is a block diagram illustrating a hardware configuration example of the smartphone 1.

The smartphone 1 is configured by connecting a microphone 32, a display 33, an operation unit 34, a speaker 35, a storage unit 36, and a communication unit 37 to a controller 31.

The controller 31 includes a central processing unit (CPU), a read only memory (ROM), a random access memory (RAM), and the like. The controller 31 executes a predetermined program and controls operation of the smartphone 1 as a whole. For example, the controller 31 plays audio data of music selected by the user, and outputs audio data for the L channel and audio data for the R channel to the communication unit 37.

The microphone 32 outputs an audio signal of collected sound or the like to the controller 31.

Under control by the controller 31, the display 33 displays various types of information such as a presentation screen of the result of the left-right determination.

The operation unit 34 includes an operation button, a touch panel, and the like provided on a surface of a housing of the smartphone 1. The operation unit 34 outputs information indicating content of operation by the user to the controller 31.

The speaker 35 outputs audio on the basis of the audio signal supplied from the controller 31.

The storage unit 36 includes a flash memory or a memory card inserted into a card slot provided in the housing. The storage unit 36 stores various data supplied from the controller 31.

The communication unit 37 includes a communication module of wireless communication such as Bluetooth. The communication unit 37 transmits various data such as the audio data supplied from the controller 31 to each unit 11.

Furthermore, the communication unit 37 receives the sensor data and a wearing detection signal that are transmitted from each unit 11. The wearing detection signal is a signal transmitted from the unit 11 detected to be worn on an ear. The communication unit 37 outputs, to the controller 31, various types of information transmitted from the unit 11.

Figure 5:
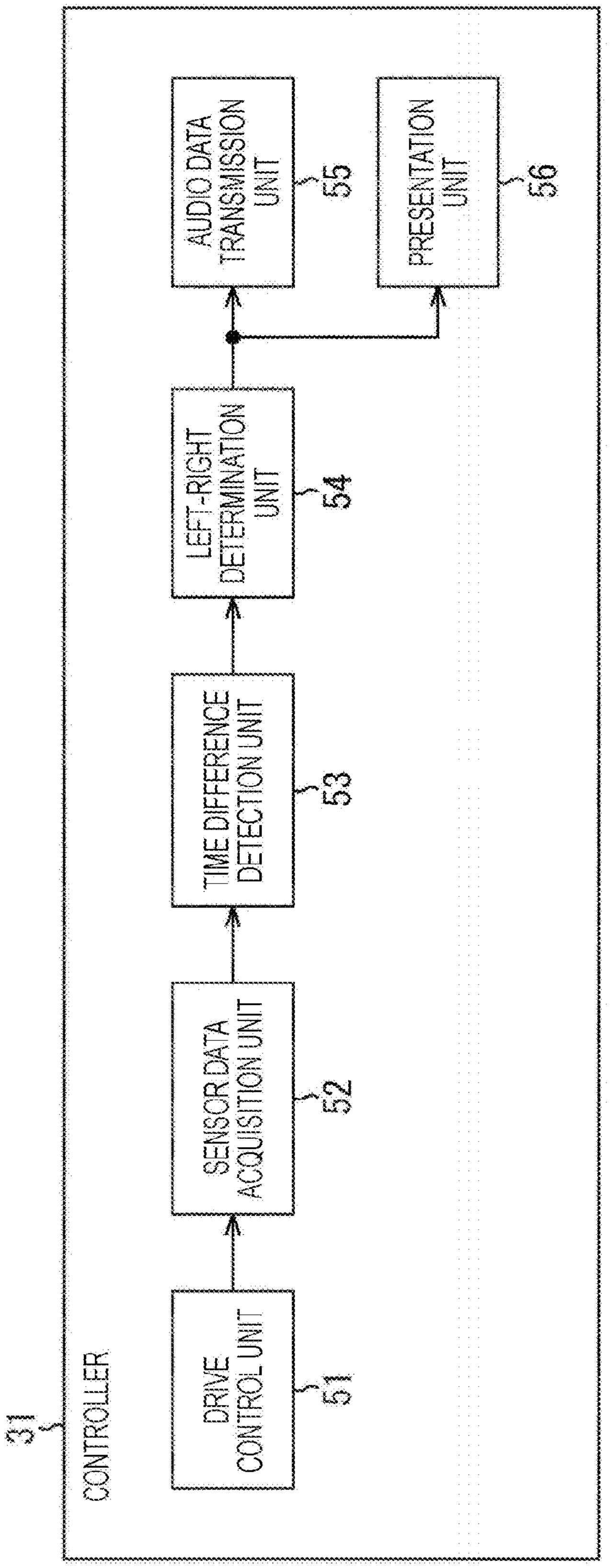
FIG. 5 is a block diagram illustrating a functional configuration example of a controller of the smartphone.

FIG. 5 is a block diagram illustrating a functional configuration example of the controller 31.

The controller 31 includes a drive control unit 51, a sensor data acquisition unit 52, a time difference detection unit 53, a left-right determination unit 54, an audio data transmission unit 55, and a presentation unit 56. At least a part of the configuration illustrated in FIG. 5 is implemented by the CPU included in the controller 31 executing a predetermined program.

The drive control unit 51 controls the communication unit 37 to communicate with the unit 11, and controls driving of each unit 11. The drive control unit 51 performs control of synchronization of internal clocks managed by the respective units 11, control of a sampling frequency for the pulse-wave sensor 12, and the like. Information indicating content of control of the unit 11 by the drive control unit 51 is output to the sensor data acquisition unit 52.

The sensor data acquisition unit 52 acquires sensor data transmitted from each unit 11 and received by the communication unit 37. The data acquired by the sensor data acquisition unit 52 is output to the time difference detection unit 53.

The time difference detection unit 53 detects time difference between the left and right pulse waves on the basis of the sensor data supplied from the sensor data acquisition unit 52. For example, the peaks of the left and right pulse waves are detected on the basis of the sensor data, and the time difference between the peaks is detected as the time difference between the left and right pulse waves. Information indicating a result of detecting the time difference between the left and right pulse waves is output to the left-right determination unit 54. Instead of the time difference of the peaks, time difference of another position of the pulse waves may be detected.

The left-right determination unit 54 performs left-right determination on the basis of the detection result supplied from the time difference detection unit 53. As described above, for example, it is determined that the unit 11 for measuring a pulse wave having an early peak timing is worn on the left ear, and that the unit 11 for measuring a pulse wave having a late peak timing is worn on the right ear. Information indicating a result of determination as to whether each unit 11 is worn on the left ear or right ear of the user is output to the audio data transmission unit 55 and the presentation unit 56.

The audio data transmission unit 55 controls the communication unit 37, and transmits the audio data to each unit 11 on the basis of the determination result supplied from the left-right determination unit 54. The audio data transmission unit 55 transmits the audio data for the L channel to the unit 11 determined to be worn on the left ear, and transmits the audio data for the R channel to the unit 11 determined to be worn on the right ear.

The presentation unit 56 presents to the user the determination result supplied from the left-right determination unit 54. For example, the presentation unit 56 presents the result of the left-right determination by causing the display 33 to display a screen showing the result of the left-right determination, or by causing the earphones 2 to output audio indicating the result of the left-right determination.

Configuration of Earphones 2

Figure 6:
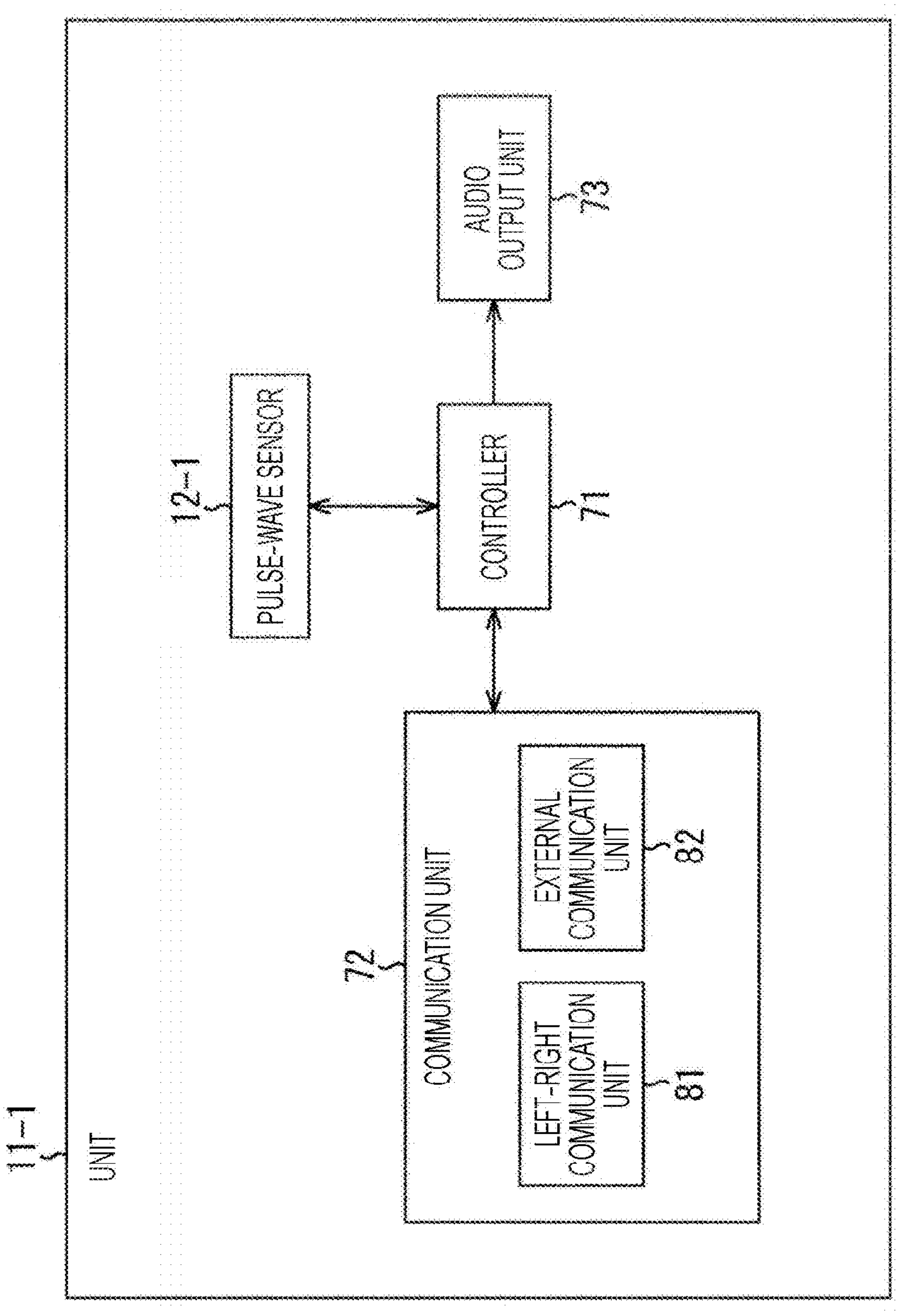
FIG. 6 is a block diagram illustrating a hardware configuration example of earphones.

FIG. 6 is a block diagram illustrating a hardware configuration example of the unit 11-1 that constitutes the earphones 2. The unit 11-2 also has a configuration similar to the configuration illustrated in FIG. 6.

The unit 11-1 is configured by the pulse-wave sensor 12-1, a communication unit 72, and an audio output unit 73 being connected to a controller 71. Another configuration such as a battery is also provided in the housing of the unit 11-1.

The controller 71 includes a CPU, a ROM, a RAM, and the like. The controller 71 executes a predetermined program and controls operation of the unit 11-1 as a whole.

The pulse-wave sensor 12-1 measures a pulse wave of a portion near an ear on which the unit 11-1 is worn. To the controller 71, the pulse-wave sensor 12-1 outputs sensor data indicating a measurement result.

The communication unit 72 includes a left-right communication unit 81 and an external communication unit 82.

The left-right communication unit 81 communicates with the unit 11-2. For example, the left-right communication unit 81 transmits and receives a clock signal used to establish synchronization of clocks that define the pulse-wave measurement timing.

The external communication unit 82 includes a communication module for wireless communication. The external communication unit 82 performs wireless communication with the smartphone 1, and transmits, to the smartphone 1, the sensor data and wearing detection signal supplied from the controller 71.

Furthermore, the external communication unit 82 receives the clock signal, sampling frequency information, and audio data transmitted from the smartphone 1. To the controller 71, the external communication unit 82 outputs information transmitted from the smartphone 1. For example, the audio data received by the external communication unit 82 is supplied to the audio output unit 73 via the controller 71.

The audio output unit 73 outputs audio on the basis of the audio data supplied from the controller 71. In a case where the left-right determination is performed in the smartphone 1 as described above, audio for the L channel is output when the unit 11-1 is worn on the left ear, and audio for the R channel is output when the unit 11-1 is worn on the right ear.

Figure 7:
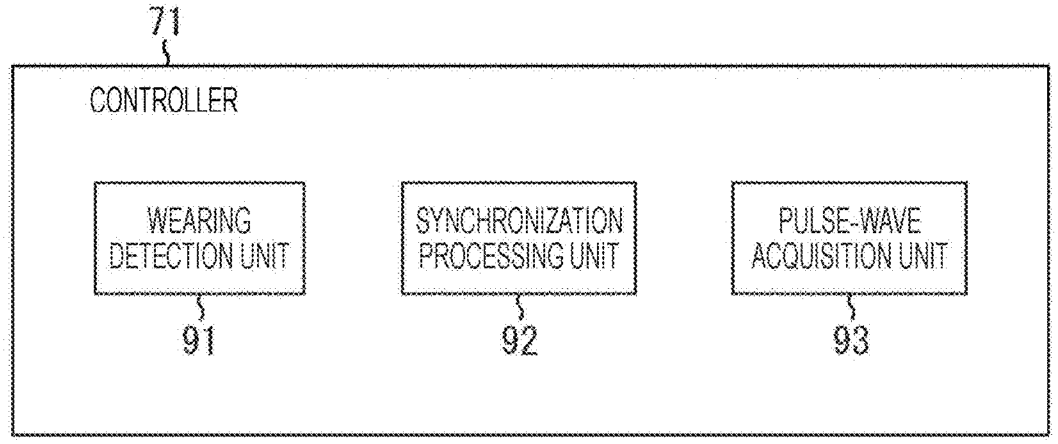
FIG. 7 is a block diagram illustrating a functional configuration example of a controller of the earphones.

FIG. 7 is a block diagram illustrating a functional configuration example of the controller 71.

The controller 71 includes a wearing detection unit 91, a synchronization processing unit 92, and a pulse-wave acquisition unit 93.

For example, in response to the pulse-wave sensor 12-1 having measured a pulse wave, the wearing detection unit 91 detects that the unit 11-1 is worn on an ear of the user, and transmits the wearing detection signal to the smartphone 1.

On the basis of the clock signal or the like transmitted from the smartphone 1, the synchronization processing unit 92 synchronizes clocks that define the pulse-wave measurement timing, with the unit 11-2.

The pulse-wave acquisition unit 93 sets a sampling frequency for the pulse-wave sensor 12-1 on the basis of the information supplied from the external communication unit 82. For example, the pulse-wave acquisition unit 93 sets a sampling frequency for left-right determination when left-right determination is performed, and, according to an application, sets a sampling frequency lower than the sampling frequency for the left-right determination when the left-right determination is completed. In response to pulse-wave measurement being performed, the pulse-wave acquisition unit 93 outputs, to the external communication unit 82, the sensor data supplied from the pulse-wave sensor 12-1, and causes the external communication unit 82 to transmit the sensor data to the smartphone 1.

3. Operation of Information Processing System

Here, operation of each apparatus having the configuration described above will be described.

Operation of Smartphone 1

Figure 8:
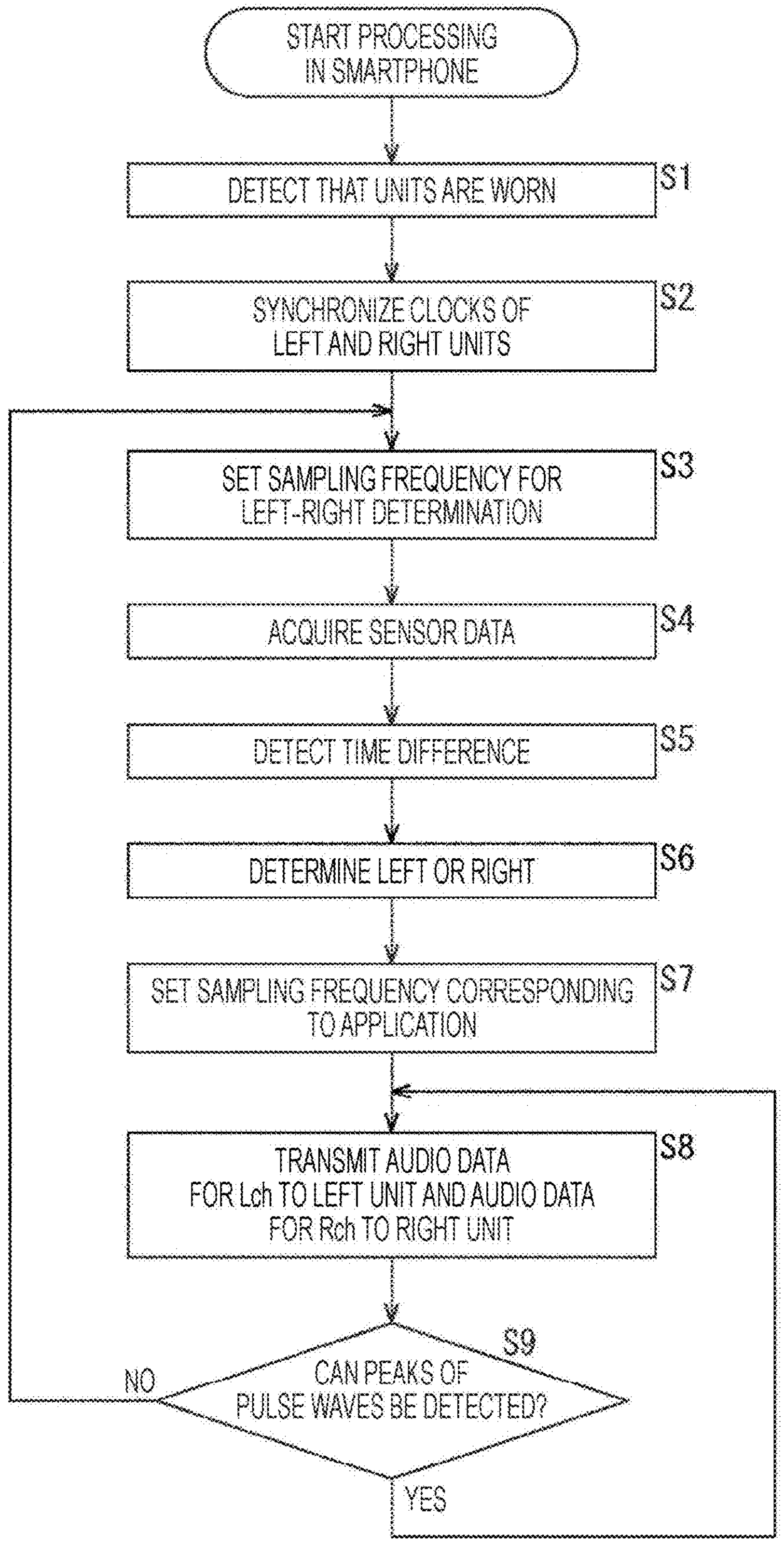
FIG. 8 is a flowchart for describing a series of processing in the smartphone.

Processing in the smartphone 1 will be described with reference to the flowchart in FIG. 8. The processing in FIG. 8 is started, for example, when the wearing detection signal is transmitted from the respective units 11.

In Step S1, on the basis of the wearing detection signal transmitted from the units 11, the drive control unit 51 detects that the units 11 are worn on an ear of the user.

In Step S2, in response to the respective units 11 having been detected to be worn on the ears of the user, the drive control unit 51 synchronizes the clocks that define the pulse-wave measurement timing, between the respective units 11. As a clock synchronization method, for example, there are the following methods.

Synchronization Method 1

The drive control unit 51 causes another unit 11 to transmit a clock signal indicating a common main clock managed by one unit 11, which is either the unit 11-1 or the unit 11-2, thereby synchronizing the clocks in the respective controllers 71.

Synchronization Method 2

In a case where either one unit 11 operates as a master and another unit 11 operates as a slave, the master unit 11 receives sensor data transmitted from the slave unit 11, and synchronizes time of the received sensor data with time of the sensor data measured in the master unit 11 with resampling or the like (matches time axes of the sensor data). To the smartphone 1, the master unit 11 collectively transmits the sensor data measured in both the units 11 and subjected to the time synchronization.

Synchronization Method 3

In a case where either one unit 11 operates as a master and another unit 11 operates as a slave, the master unit 11 transmits, to the slave unit 11 at regular time intervals, a clock signal serving as a synchronization signal or a command instructing start of the measurement. The transmission of the clock signal or the like from the master unit 11 to the slave unit 11 is performed, for example, under the control of the drive control unit 51.

Synchronization Method 4

The drive control unit 51 synchronizes the clocks by transmitting the same clock signal to each of the units 11.

After the synchronization of the clocks is established as described above, in Step S3, the drive control unit 51 sets the sampling frequency for the pulse-wave sensors 12 mounted on the respective units 11 to a frequency for the left-right determination, and starts the pulse-wave measurement. For example, a frequency of 100 Hz or more, such as 256 Hz, is set as the sampling frequency for the left-right determination.

In Step S4, the sensor data acquisition unit 52 acquires sensor data of the pulse waves, the sensor data being transmitted from each unit 11.

In Step S5, the time difference detection unit 53 detects the time difference between the peaks of the left and right pulse waves on the basis of the sensor data of the pulse waves.

In Step S6, on the basis of the time difference between the peaks of the left and right pulse waves, the left-right determination unit 54 determines whether each unit 11 is worn on a left side or right side of the ears of the user.

In Step S7, the drive control unit 51 sets the sampling frequency for the pulse-wave sensor 12 mounted on each unit 11 to a frequency corresponding to the application. For example, in a case where the wearing state is detected on the basis of the pulse waves, a frequency lower than the sampling frequency for the left-right determination is set. By setting a frequency lower than the sampling frequency for the left-right determination, it is possible to achieve power saving for the earphones 2.

In Step S8, the audio data transmission unit 55 transmits the audio data for the L channel to the unit 11 determined to be worn on the left ear, and transmits the audio data for the R channel to the unit 11 determined to be worn on the right ear. In the earphones 2, the audio for the L channel is output from the unit 11 worn on the left ear of the user, and the audio for the R channel is output from the unit 11 worn on the left ear of the user.

In Step S9, the time difference detection unit 53 judges whether or not the peaks of the pulse waves can be detected.

In a case where it is judged in Step S9 that the peaks of the pulse waves can be detected, the processing returns to Step S8, and the transmission of the audio data is continued.

Meanwhile, in a case where it is judged in Step S9 that the peaks of the pulse waves cannot be detected, the processing returns to Step S3, and the processing described above is repeated. For example, in a case where both the unit 11-1 and the unit 11-2 are removed from the ears, the processing in FIG. 8 is performed again.

About Time Difference Detection

Figure 9:
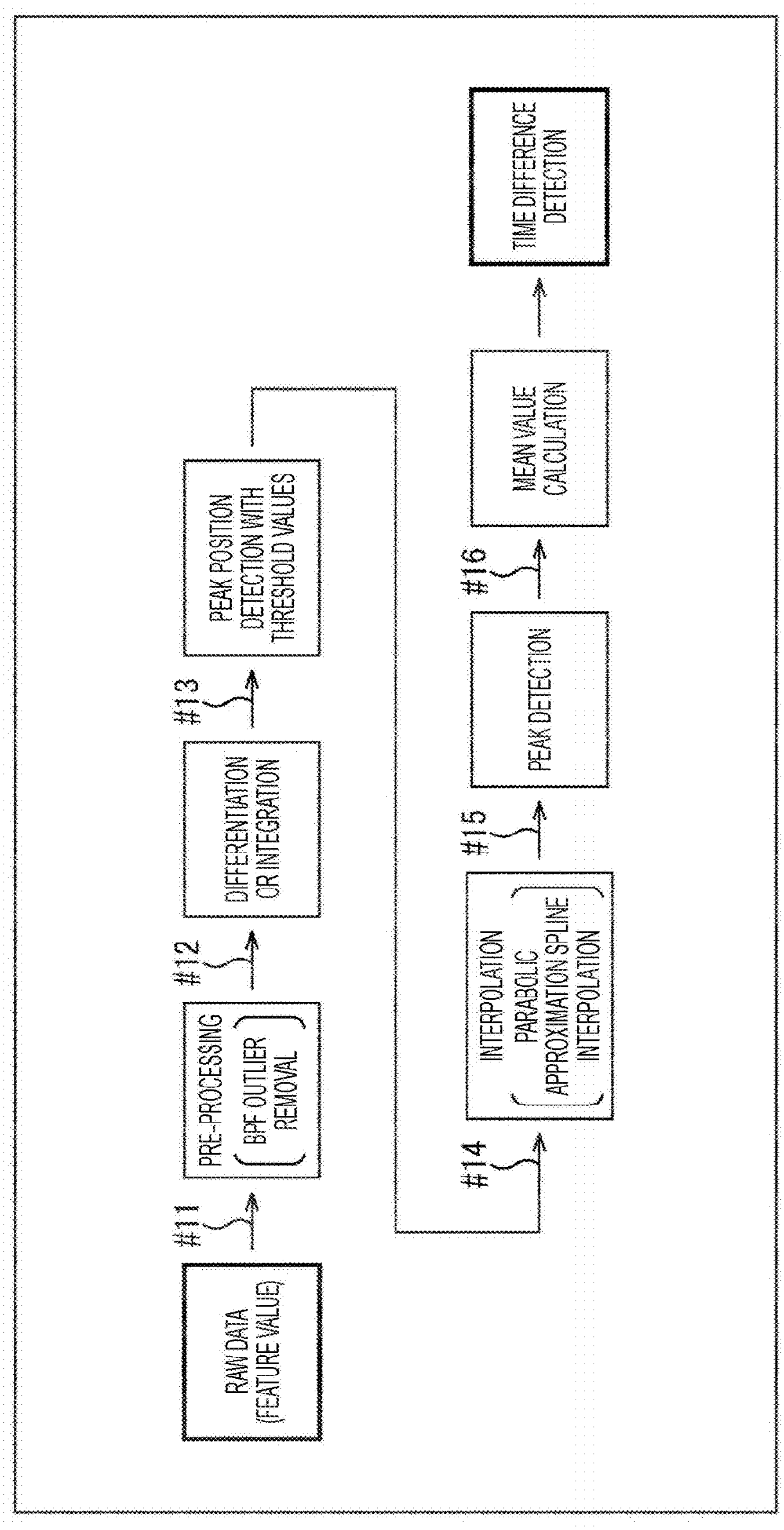
FIG. 9 is a diagram illustrating a flow of signal processing by a time difference detection unit.

FIG. 9 is a diagram illustrating a flow of signal processing by the time difference detection unit 53. The processing illustrated in FIG. 9 is performed as processing in Step S5.

As pointed by the arrow #11 in FIG. 9, sensor data obtained by measuring the pulse waves is subjected to pre-processing, such as filtering using a band pass filter, and outlier removal.

As pointed by the arrow #12, differentiation or integration is performed on the sensor data subjected to the pre-processing. By the differential processing or integration processing being performed, values near the peaks of the left and right pulse waves are sharpened as illustrated in FIG. 10, and thus accuracy in detecting peak positions can be improved.

Figure 10:
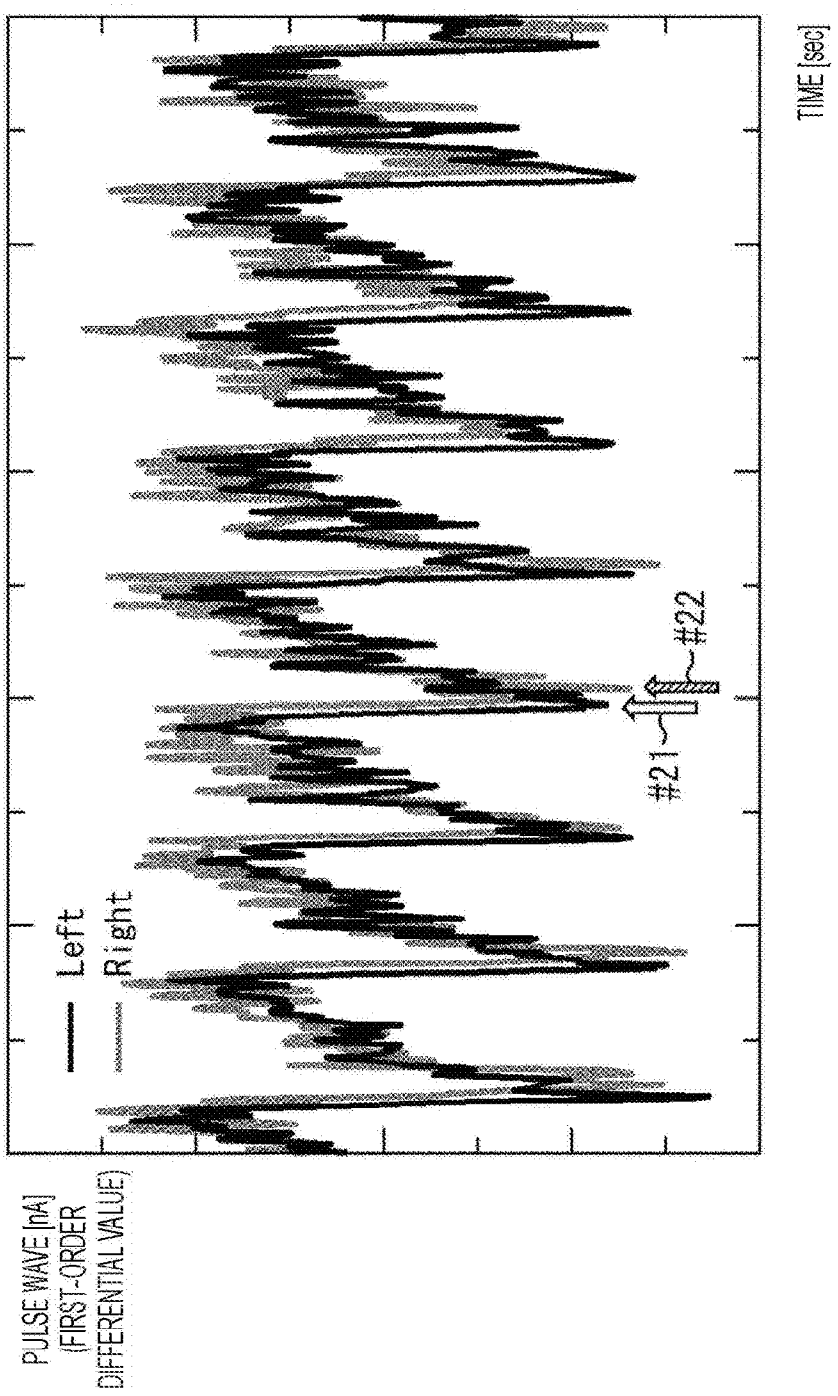
FIG. 10 is a diagram illustrating first-order differential values of the left and right pulse waves.

FIG. 10 is a diagram illustrating first-order differential values of the left and right pulse waves. The up arrows #21 and #22 in FIG. 10 denote the respective peak positions of the pulse wave of the left ear and the pulse wave of the right ear. Here, optimal differential processing or integration processing is used in order to sharpen the peaks, and the differential processing or integration processing may be performed a plurality of times with second-order differentiation or the like.

As pointed by the arrow #13, after the differentiation or integration is performed, positions having a value equal to or greater than a predetermined threshold value are detected as peak positions.

As pointed by the arrow #14, after the peak positions are detected, interpolation is performed, with reference to the peak positions, on values of the sensor data of the pulse waves within a predetermined range in vicinity of the peak positions. In a case where the differentiation or integration has been performed, interpolation is performed on waveforms of the values of the sensor data of the pulse waves subjected to the differentiation or integration. The interpolation of the data is performed with, for example, parabolic approximation or spline interpolation.

As pointed by the arrow #15, after the interpolation is performed, the peaks of the pulse waves are detected.

As pointed by the arrow #16, after the peaks of the pulse waves are detected, a mean value of the time difference of the peaks of the pulse waves of a predetermined number, which is about 10 beats, is calculated. By using the mean value, it is possible to more accurately detect the time difference of the peaks of the pulse waves.

Detection of the time difference of the peaks of the left and right pulse waves is performed, for example, as described above. Temporal resolution of the peak positions can be improved by performing the differential processing or integration processing, interpolation processing, or the like.

Note that at least some of the each piece of processing illustrated in FIG. 9 can be omitted. For example, among the pre-processing, differentiation or integration, peak position detection with a threshold value, interpolation, peak detection, and mean value calculation, the differentiation or integration, the peak position detection with a threshold value, the interpolation, and the mean value calculation can be omitted.

Operation of Earphones 2

Figure 11:
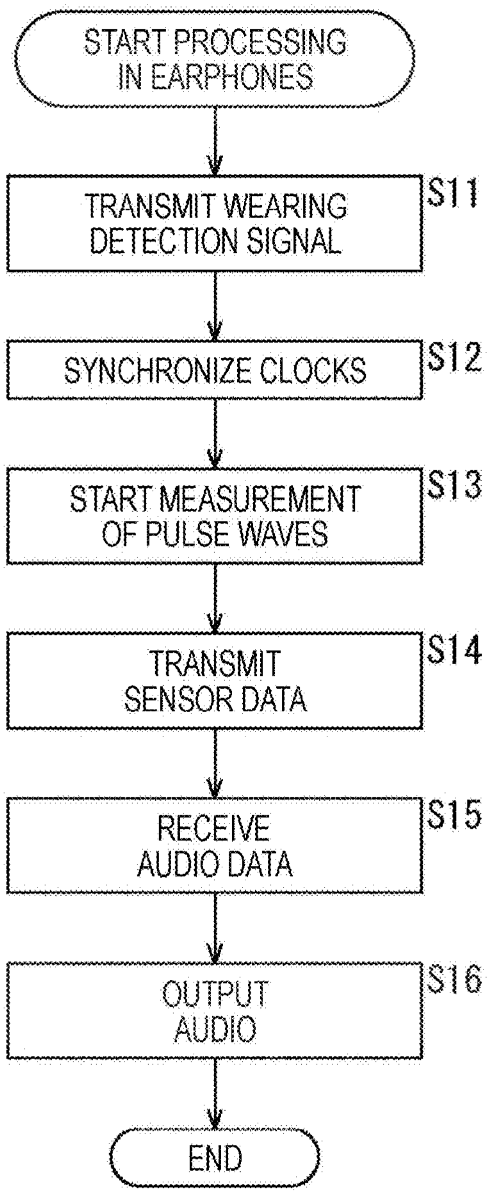
FIG. 11 is a flowchart for describing a series of processing in the earphones.

Next, processing in the unit 11-1 that constitutes the earphones 2 will be described with reference to the flowchart in FIG. 11. The processing in FIG. 11 is started, for example, in response to detection of the unit 11-1 being worn on an ear of the user. Also in the unit 11-2, processing similar to the processing illustrated in FIG. 11 is performed.

In Step S11, the wearing detection unit 91 detects that the housing of the unit 11-1 is worn on the ear of the user, and transmits the wearing detection signal to the smartphone 1.

In Step S12, on the basis of a clock signal or the like transmitted from the smartphone 1 or the unit 11-2, the synchronization processing unit 92 synchronizes the clocks that define the pulse-wave measurement timing.

In Step S13, the pulse-wave acquisition unit 93 starts measurement of the left and right pulse waves on the basis of the sampling frequency for the left-right determination set by the drive control unit 51.

In Step S14, the external communication unit 82 transmits the sensor data of the pulse waves to the smartphone 1. The left-right determination is performed in the smartphone 1 in response to the transmission of the sensor data. Furthermore, audio data is transmitted from the smartphone 1 on the basis of the result of the left-right determination.

In Step S15, the external communication unit 82 receives the audio data transmitted from the smartphone 1.

In Step S16, the audio output unit 73 outputs audio on the basis of the audio data supplied from the controller 71. Audio for the L channel is output in a case where the unit 11-1 is worn on the left ear, and audio for the R channel is output in a case where the unit 11-1 is worn on the right ear. When the transmission of the audio data ends in the smartphone 1, the processing in FIG. 11 ends.

Through the above-described processing, the smartphone 1 can determine whether each unit 11 is worn on the left ear or right ear of the user.

By distributing the audio data in accordance with the wearing state of the units 11, the user can use the earphones 2 without being conscious of whether each unit 11 is for the left ear or for the right ear. As a result, it is possible to provide a device and service that are more convenient for the user.

Furthermore, by the result of the left-right determination being presented, the user can recognize whether the earphones 2 are correctly worn, or worn the other way around.

For example, when the user switches the units 11 in response to an announcement that is output to notify of erroneous wearing in a case where the earphones 2 are worn the other way around, transmission of the audio data is started as described above. Therefore, it is possible to implement seamless distribution of the announcement that notifies of erroneous wearing and the stereo sound source.

4. Modifications

Example in Which Left-Right Determination is Performed on Earphone Side

Figure 12:
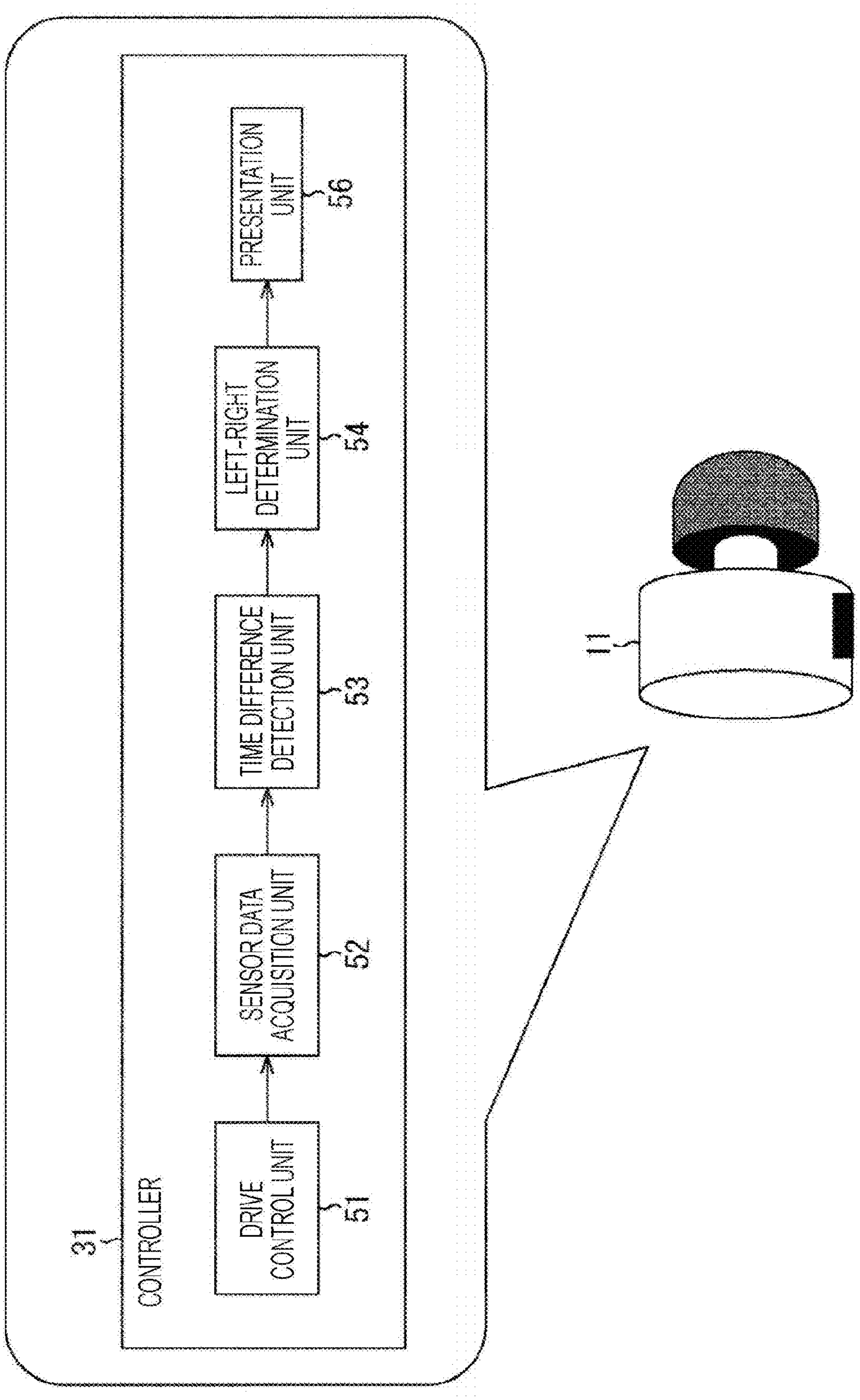
FIG. 12 is a diagram illustrating another configuration example of the earphones.

FIG. 12 is a diagram illustrating another configuration example of a unit 11 that constitutes the earphones 2.

As illustrated in the balloon in FIG. 12, some of functions of the controller 31 of the smartphone 1 may be mounted on the unit 11, and the left-right determination may be performed in the unit 11. In this case, the result of the left-right determination is presented by the presentation unit 56 by using audio. The left-right determination performed in the unit 11 is also performed in a similar manner to the left-right determination performed in the smartphone 1.

About Wearing Detection of Units

Although it is described that the wearing detection as to whether or not a unit 11 is worn on an ear is performed on the basis of whether or not a pulse wave can be measured, the wearing detection may be performed by another method.

For example, the wearing detection of the unit 11 is performed by electrical measurement through a portion in contact with a human body. The portion in contact with the human body includes, for example, an earpiece.

Example of Device

Although it is described that the left-right determination based on the sensor data of the pulse waves is performed for earphones, it is also possible to perform the left-right determination for another wearable device.

Figure 13A:
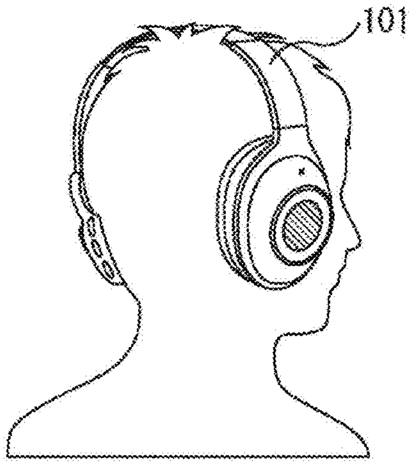
FIGS. 13A and 13B are diagrams illustrating examples of a device.
Figure 13B:
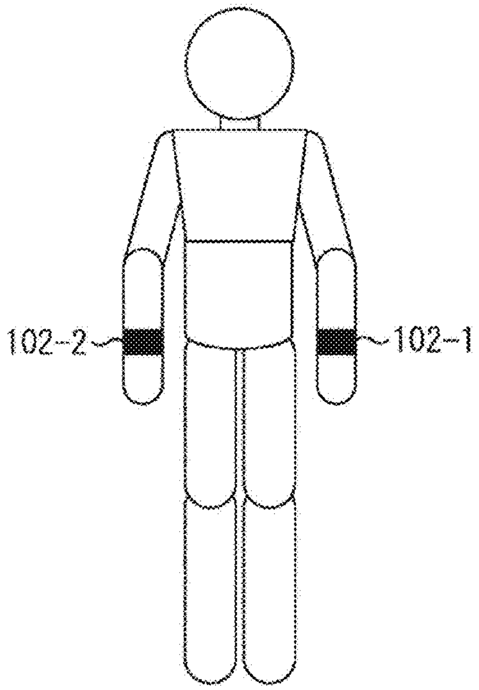

FIGS. 13A and 13B are diagrams illustrating examples of the device.

As illustrated in FIG. 13A, the left-right determination can be performed for the headphones 101. A pulse-wave sensor is provided in each of the left and right units of the headphones 101. On the basis of the sensor data of the pulse waves of portions in vicinity of the ears, the pulse waves being measured by the pulse-wave sensors provided in the respective left and right units of the headphones 101, processing similar to the above-described processing is performed, and whether each unit is worn on the left side or on the right side is determined in the smartphone 1 (not illustrated) or the like.

Furthermore, as illustrated in FIG. 13B, it is possible to perform the left-right determination on a wristband-type wearable device 102. The wearable device 102 includes a unit 102-1 and a unit 102-2.

A pulse-wave sensor is provided in the unit 102-1 worn on a left wrist and the unit 102-2 worn on a right wrist. On the basis of sensor data of a pulse wave of the left wrist measured by the pulse-wave sensor provided in the unit 102-1 and sensor data of a pulse wave of the right wrist measured by the pulse-wave sensor provided in the unit 102-2, processing similar to the above-described processing is performed, and whether each unit is worn on the left side or on the right side is determined in the smartphone 1 or the like.

As described above, it is possible to perform the left-right determination based on sensor data of the pulse waves for a wearable device worn on body parts other than ears. It is also possible to perform the left-right determination on a wearable device to be worn on left and right ankles or a ring-type wearable device to be worn on a finger of a left hand and a finger of a right hand. The present technology is applicable to various wearable devices to be worn on corresponding positions of left and right sides of a body.

Furthermore, the number of units that constitute one device is not limited to two. The present technology is applicable to a device including three or more units as long as the device is worn on the left and right of the body.

Although it is described that the apparatus that performs the left-right determination of the device is a smartphone, the left-right determination may be performed in another information processing apparatus such as a PC or a tablet terminal.

5. Others

About Program

The series of processing described above can be executed by hardware or software. In a case where the series of processing steps is executed by software, a program included in the software is installed from a program recording medium on a computer incorporated in dedicated hardware, a general-purpose personal computer, or the like.

Figure 14:
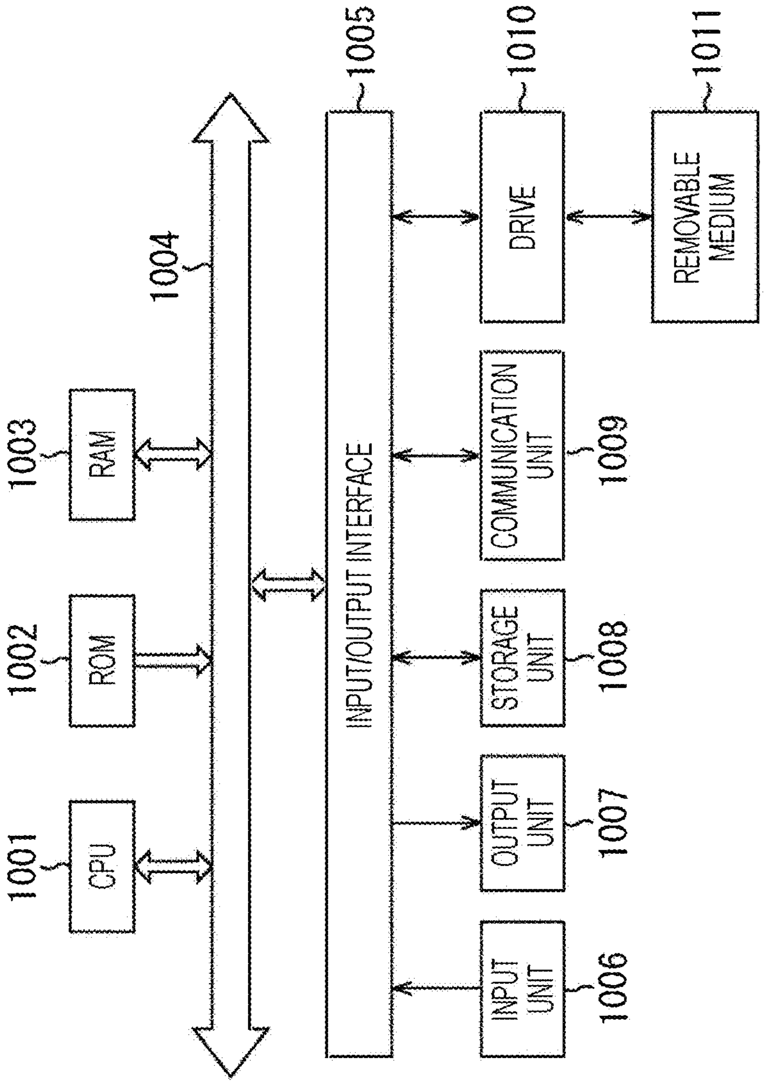
FIG. 14 is a block diagram illustrating a configuration example of hardware of a computer.

FIG. 14 is a block diagram illustrating a configuration example of hardware of a computer that executes the series of processing described above according to a program.

A central processing unit (CPU) 1001, a read only memory (ROM) 1002, and a random access memory (RAM) 1003 are interconnected via a bus 1004.

An input/output interface 1005 is further connected to the bus 1004. The input/output interface 1005 is connected with an input unit 1006 including, for example, a keyboard and a mouse, and an output unit 1007 including, for example, a display and a speaker. Furthermore, the input/output interface 1005 is connected with a storage unit 1008 including, for example, a hard disk and a non-volatile memory, a communication unit 1009 including, for example, a network interface, and a drive 1010 driving a removable medium 1011.

In the computer configured as described above, for example, the CPU 1001 loads a program stored in the storage unit 1008 into the RAM 1003 via the input/output interface 1005 and the bus 1004 and executes the program to perform the above-described series of processing.

For example, the program to be executed by the CPU 1001 is recorded in the removable medium 1011 or provided via a wired or wireless transmission medium such as a local area network, the Internet, or a digital broadcast, and installed in the storage unit 1008.

The program to be executed by the computer may be a program in which processing is performed in time series in the order described in the present specification, or may be a program in which processing is performed in parallel or at necessary timing, such as when a call is made.

The effects described in the present specification are merely examples and are not restrictive, and other effects may also be produced.

An embodiment of the present technology is not limited to the embodiment described above, and various modifications can be made without departing from the scope of the present technology.

For example, the present technology may be configured as cloud computing in which a function is shared by a plurality of apparatuses via the network to processing together.

Furthermore, each step described in the flowchart described above can be carried out by one apparatus or by a plurality of apparatuses in a shared manner.

Moreover, in a case where a plurality of pieces of processing is included in one step, the plurality of pieces of processing included in the one step can be executed by one apparatus or executed by a plurality of apparatuses in a shared manner.

Examples of Combinations of Configurations

The present technology can have the following configurations.

(1)

An information processing apparatus including a determination unit that determines, on the basis of a time difference in pulse waves measured in each of a plurality of units that constitutes a device worn by a user, whether each of the units is worn on a left side or right side of a body of the user.

(2)

The information processing apparatus according to (1), in which the determination unit determines that the unit for measuring a pulse wave having an early peak timing is worn on the left side of the body of the user, and determines that the unit for measuring a pulse wave having a late peak timing is worn on the right side of the body of the user.

(3)

The information processing apparatus according to (1) or (2), further including a time difference detection unit that detects a time difference between pulse waves measured in each of a plurality of the units.

(4)

The information processing apparatus according to (3), in which the time difference detection unit performs interpolation on a value of sensor data of the pulse waves, or on a differential value or integral value of a value of sensor data of the pulse waves, and detects peaks of pulse waves on the basis of a value after the interpolation.

(5)

The information processing apparatus according to (4), in which the interpolation is performed with parabolic approximation or spline interpolation.

(6)

The information processing apparatus according to (4) or (5), in which the time difference detection unit performs the interpolation on sensor data of the pulse waves within a predetermined range in vicinity with reference to a peak position having a value equal to or greater than a threshold value.

(7)

The information processing apparatus according to any one of (1) to (6), further including a presentation unit that presents to the user a result of determination by the determination unit.

(8)

The information processing apparatus according to any one of (1) to (7), further including an audio data transmission unit that transmits audio data to each of a plurality of the units on the basis of a result of determination by the determination unit.

(9)

The information processing apparatus according to any one of (1) to (8), further including a drive control unit that controls drive of a plurality of the units.

(10)

The information processing apparatus according to (9), in which the drive control unit sets a sampling frequency for a pulse-wave sensor mounted on each of a plurality of the units.

(11)

The information processing apparatus according to (10), in which the drive control unit sets a sampling frequency of 100 Hz or more.

(12)

The information processing apparatus according to any one of (9) to (11), in which the drive control unit controls synchronization of clocks that define a pulse-wave measurement timing in each of a plurality of the units.

(13)

The information processing apparatus according to (12), in which the drive control unit synchronizes clocks in response to a plurality of the units having been detected to be worn on a body of the user.

(14)

The information processing apparatus according to (12) or (13), in which the drive control unit synchronizes clocks by transmitting the same clock signal to each of a plurality of the units, or by transmitting a clock signal from either the unit to another the unit.

(15)

The information processing apparatus according to any one of (1) to (14), in which a housing of the unit worn on the left side of the body of the user and a housing of the unit worn on the right side of the body of the user have a bilaterally symmetrical shape or a shape approximate to a bilaterally symmetrical shape.

(16)

The information processing apparatus according to any one of (1) to (15), further including a communication unit that communicates with the units and receives sensor data of the pulse waves measured in each of a plurality of the units, in which the determination unit determines, on the basis of the sensor data transmitted from each of the units, whether each of the units is worn on the left side or right side of the body of the user.

(17)

The information processing apparatus according to any one of (1) to (16), in which the information processing apparatus includes a device mounted on the units.

(18)

An information processing method including determining, by an information processing apparatus, on the basis of a time difference in pulse waves measured in each of a plurality of units that constitutes a device worn by a user, whether each of the units is worn on a left side or right side of a body of the user.

(19)

A program for causing a computer to execute processing of determining, on the basis of a time difference in pulse waves measured in each of a plurality of units that constitutes a device worn by a user, whether each of the units is worn on a left side or right side of a body of the user.

REFERENCE SIGNS LIST

1 Smartphone
2 Earphone
11-1, 11-2 Unit

12-1, 12-2 Pulse-wave sensor
31 Controller
51 Drive control unit
52 Sensor data acquisition unit
53 Time difference detection unit
54 Left-right determination unit
55 Audio data transmission unit
56 Presentation unit
71 Controller
73 Audio output unit
81 Left-right communication unit
82 External communication unit
91 Wearing detection unit
92 Synchronization processing unit
93 Pulse-wave acquisition unit

The invention claimed is:

1. An information processing apparatus, comprising:
a drive control unit configured to:
control drive of a plurality of units that constitutes a device that is user wearable; and
control synchronization of clocks that define a pulse-wave measurement timing in each of the plurality of units, wherein the plurality of units measures pulse waves; and
a determination unit configured to determine, based on a time difference in the pulse waves measured in each of the plurality of units, whether each of the plurality of units is worn on a left side of a user body or a right side of the user body.

2. The information processing apparatus according to claim 1, wherein
the determination unit is further configured to:
determine that a first unit of the plurality of units, that measures a first pulse wave of the pulse waves, is worn on the left side of the user body; and
determine that a second unit of the plurality of units, that measures a second pulse wave of the pulse waves, is worn on the right side of the user body, and
the first pulse wave has a peak timing that is earlier than a peak timing of the second pulse wave.

3. The information processing apparatus according to claim 1, further comprising a time difference detection unit configured to detect the time difference between the pulse waves measured in each of the plurality of units.

4. The information processing apparatus according to claim 3, wherein
the time difference detection unit is further configured to:
perform interpolation on one of a value of sensor data of the pulse waves, a differential value of the value of the sensor data of the pulse waves, or an integral value of the value of the sensor data of the pulse waves; and
detect peaks of the pulse waves based on the value of the sensor data of the pulse waves after the interpolation.

5. The information processing apparatus according to claim 4, wherein the interpolation is performed with one of a parabolic approximation or a spline interpolation.

6. The information processing apparatus according to claim 4, wherein
the time difference detection unit is further configured to perform the interpolation on the sensor data of the pulse waves within a specific range,
the specific range is associated with peak positions of the pulse waves, and
the peak positions have a value one of equal to a threshold value or greater than the threshold value.

7. The information processing apparatus according to claim 1, further comprising a presentation unit configured to present a result of the determination.

8. The information processing apparatus according to claim 1, further comprising an audio data transmission unit configured to transmit audio data to each of the plurality of units based on a result of the determination.

9. The information processing apparatus according to claim 1, wherein
the drive control unit is further configured to set a sampling frequency for a pulse-wave sensor mounted on each of the plurality of units.

10. The information processing apparatus according to claim 9, wherein the drive control unit is further configured to set the sampling frequency of at least 100 Hz.

11. The information processing apparatus according to claim 1, wherein the control of the synchronization of the clocks is based on a detection that the plurality of units is worn on the user body.

12. The information processing apparatus according to claim 1, wherein the drive control unit is further configured to:
transmit a same clock signal to each of the plurality of units, or
control transmission of a clock signal from one of the plurality of units to other of the one of the plurality of units; and
control the synchronization between the clocks based on one of the transmission of the same clock signal to each of the plurality of units, or the transmission of the clock signal from the one of the plurality of units to the other of the one of the plurality of units.

13. The information processing apparatus according to claim 1, wherein
the plurality of units includes a first unit on the left side of the user body, and a second unit on the right side of the user body, and
a housing of the first unit worn on the left side and a housing of the second unit worn on the right side have one of a bilaterally symmetrical shape or a shape approximate to the bilaterally symmetrical shape.

14. The information processing apparatus according to claim 1, further comprising
a communication unit configured to:
communicate with the plurality of units; and
receive, based on the communication, sensor data of the pulse waves, wherein
the determination, that whether each of the plurality of units is worn on the left side or the right side is based on the received sensor data.

15. The information processing apparatus according to claim 1, further comprising a second device mountable on the plurality of units.

16. An information processing method, comprising
controlling, by an information processing apparatus, drive of a plurality of units that constitutes a device that is user wearable;
controlling, by the information processing apparatus, synchronization of clocks that define a pulse-wave measurement timing in each of the plurality of units, wherein the plurality of units measures pulse waves; and
determining, by the information processing apparatus, based on a time difference in the pulse waves measured in each of the plurality of units, whether each of the plurality of units is worn on a left side of a user body or a right side of the user body.

17. A non-transitory computer readable medium having stored thereon, computer executable instructions, which when executed by a computer, cause the computer to execute operations, the operations comprising:

controlling drive of a plurality of units that constitutes a device that is user wearable;

controlling synchronization of clocks that define a pulse-wave measurement timing in each of the plurality of units, wherein the plurality of units measures pulse waves; and determining, based on a time difference in the pulse waves measured in each of the plurality of units, whether each of the plurality of units is worn on a left side of a user body or a right side of the user body.

* * * * *